United States Patent [19]

Shiraishi et al.

[11] Patent Number: 5,181,175
[45] Date of Patent: Jan. 19, 1993

[54] DRIVE WHEEL SLIP CONTROL SYSTEM FOR VEHICLE

[75] Inventors: Shuji Shiraishi; Osamu Yamamoto, both of Saitama, Japan

[73] Assignee: Honda Giken Kogyo Kabushiki Kaisha, Tokyo, Japan

[21] Appl. No.: 611,573

[22] Filed: Nov. 13, 1990

[30] Foreign Application Priority Data

Nov. 13, 1989 [JP] Japan .................. 1-294475

[51] Int. Cl.⁵ .................................... B60K 31/00
[52] U.S. Cl. .................. 364/426.03; 180/197
[58] Field of Search ............ 364/426.01, 426.03, 364/424.05; 180/197

[56] References Cited

U.S. PATENT DOCUMENTS

| | | |
|---|---|---|
| 4,884,651 | 12/1989 | Harada et al. ............ 364/426.03 X |
| 5,009,294 | 4/1991 | Ghoneim ....................... 192/1.22 |
| 5,025,882 | 6/1991 | Ghoneim et al. .................. 180/197 |
| 5,038,288 | 8/1991 | Moride et al. ................ 364/426.03 |
| 5,084,821 | 1/1992 | Ohsuga et al. ................ 364/424.05 |

Primary Examiner—Thomas G. Black
Attorney, Agent, or Firm—Armstrong, Westerman, Hattori, McLeland & Naughton

[57] ABSTRACT

Drive wheel slip control system for a vehicle includes means for setting a reference value for slippage of a drive wheel providing an appropriate slip condition, means for reducing the drive wheel torque when the slippage exceeds the reference value, means for detecting the opening degree of an accelerator of a prime mover which drives the drive wheel, and means for correcting the reference value dependent on signals from the detecting means. The vehicle responds to accelerator operation even during control of the drive wheel slip, enabling a sporty travel.

3 Claims, 2 Drawing Sheets

DRIVE WHEEL SLIP CONTROL SYSTEM FOR VEHICLE

BACKGROUND OF THE INVENTION

1. Field of the Invention

The field of the invention is a system for controlling slip of a drive wheel of a vehicle, which includes a reference value setting means for setting a reference value for slippage of the drive wheel and a drive wheel torque reduction means for reducing the torque of the drive wheel when the slippage of the drive wheel exceeds the reference value.

2. Description of the Prior Art

In a drive wheel slip control system for vehicles of the type mentioned above, there has conventionally been proposed such an arrangement that the reference value for slippage of the drive wheel, which allows an appropriate slip rate to be obtained, is corrected on the basis of the opening degree of an accelerator and when such opening degree becomes large, the reference value for the slippage of the drive wheel is increased. For example, see Japanese Patent Application Laid-open No. 23831/87.

The afore-mentioned drive wheel slip control system is effective when a vehicle is driven in a sporty fashion such as at the time of spin-turn. When the accelerator is put in full-open position, however, the reference value for slippage of the drive wheel may rise excessively and deteriorate the drive wheel slip controlling function which should inherently be exhibited by the system.

Furthermore, since the degree of throttle opening which might bring the drive wheel into an excessive slipping condition is changed dependent on the coefficient of friction of road surface, the speed reduction ratio between a prime mover and the drive wheel and the like, if it is arranged to change the slipping condition of the drive wheel at an absolute position of the throttle opening, it then becomes impossible to establish a relationship between the slippage of the drive wheel under control and the inherent throttle opening degree, thus making it difficult to provide a delicate variation in the wheel slipping condition which a driver desires.

SUMMARY OF THE INVENTION

The present invention has been proposed in view of the above circumstances and an object thereof is to provide a system for controlling slip of a drive wheel which is capable of changing the reference value for the slippage of the drive wheel in relation to the operation of an accelerator, thereby providing a closed loop of man-to-automobile, and also of keeping the drive wheel slip control function from deteriorating.

To achieve the above object, according to the present invention, there is proposed a drive wheel slip control system for a vehicle, comprising a reference value setting means for setting a reference value for slippage of a drive wheel providing an appropriate slipping condition, a drive wheel torque reduction means for reducing a torque of said drive wheel when the slippage of the drive wheel exceeds said reference value, an accelerator opening degree change rate detector for detecting a change rate of opening degree of an accelerator of a prime mover which drives said drive wheel, and a reference value correcting means for correcting said reference value dependent on a signal outputted from said accelerator opening degree change rate detector.

With the above-described arrangement, the accelerator opening degree change rate detector detects the change rate of accelerator opening degree which is a differentiated value of a change in the opening degree of the accelerator and when the detected change rate shows a positive value, that is, when the accelerator opening degree increases abruptly, the reference value correcting means operates to increase the reference value for slippage of the drive wheel whereas when that change rate is a negative value, the correcting means reduces the reference value. Thereby, the movement of the vehicle can respond to the operation of accelerator even during controlling of slippage of the drive wheel and moreover, the reference value is controlled to increase and decrease in response to the change rate of accelerator opening degree and so its change is of a momentary nature. It is assured, therefore, that the drive wheel slip control function cannot be deteriorated.

The above and other objects, features and advantages of the present invention will be apparent from reading of the following description of a preferred embodiment in conjunction with the accompanying drawings.

DESCRIPTION OF THE PREFERRED EMBODIMENT

Figure 1:
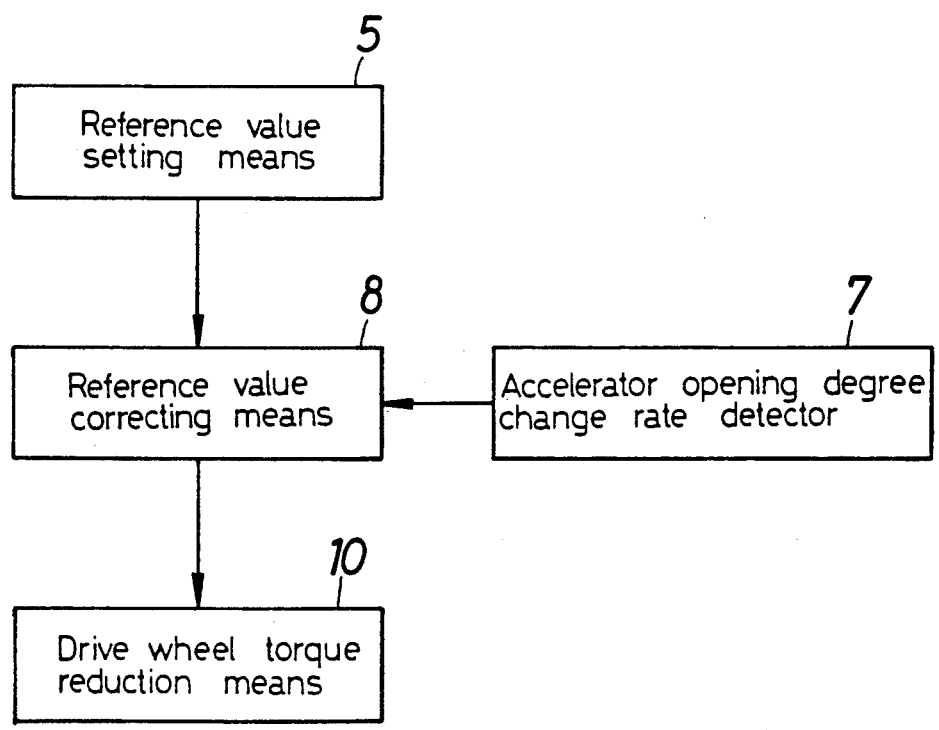
FIG. 1 is a view showing the idea according to the invention.

Hereinafter, one embodiment to which the idea according to the invention as shown in FIG. 1 is applied will be described in detail with reference to FIG. 2.

Figure 2:
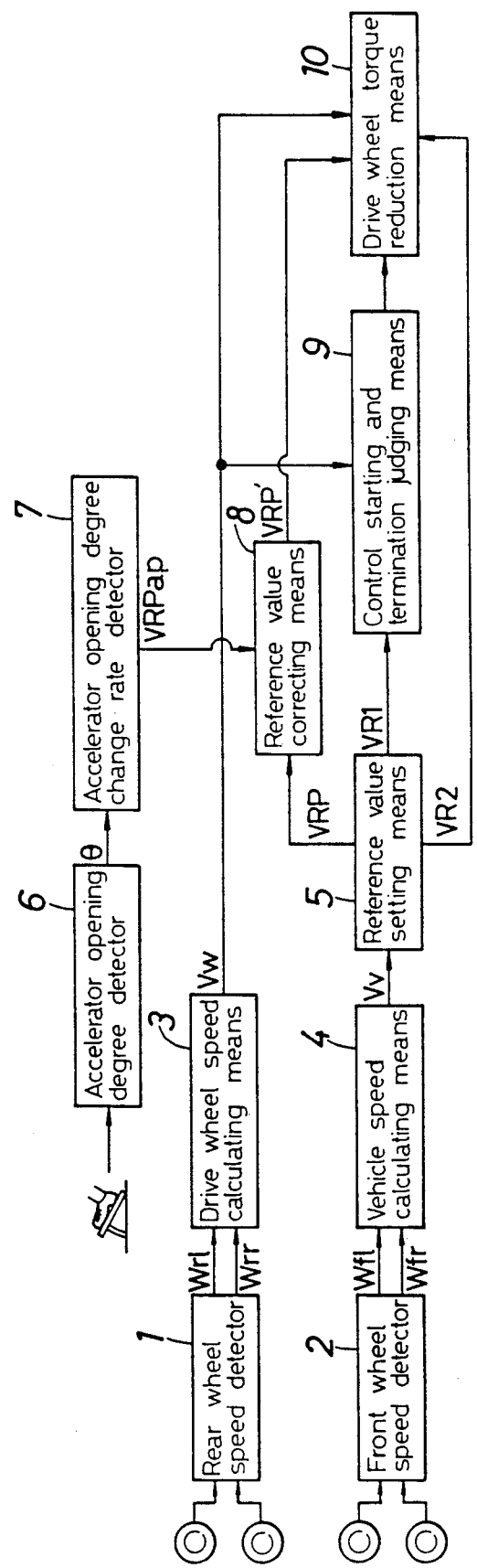
FIG. 2 is a block diagram of one embodiment to which the idea according to the invention is applied.

In FIG. 2, a rear wheel speed detector 1 detects left and right rear wheel speeds Wrl and Wrr of a rear wheel drive vehicle, which are left and right drive wheels of a vehicle according to this embodiment of the invention, and a front wheel speed detector 2 detects left and right front wheel speeds Wfl and Wfr which are follower wheel speeds according to this embodiment. The left and right rear wheel speeds Wrl and Wrr detected by the rear wheel speed detector 1 are inputted to a drive wheel speed calculating means 3 at which a drive wheel speed Vw is obtained by calculation of an average value of the left and right rear wheel speeds Wrl and Wrr. On the other hand, the left and right front wheel speeds Wfl and Wfr detected by the front wheel speed detector 2 are inputted to a vehicle speed calculating means 4 and are subjected to operation thereat for obtaining a vehicle speed Vv as an average value of the left and right front wheel speeds Wfl and Wfr.

The vehicle speed Vv obtained at the vehicle speed calculating means 4 is inputted to a reference value setting means 5 at which a reference value for slippage of the drive wheels is determined. The reference value setting means 5 carries out operations according to the following equations (1), (2) and (3) to obtain a first reference speed $V_{R1}$, a target reference speed $V_{RP}$ and a second reference speed $V_{R2}$ as reference values for drive wheel slip condition, dependent on the vehicle speed Vv inputted to said means 5:

$$V_{R1} = K_1 \times V_v \qquad (1)$$

$$V_{RP} = K_P \times V_v \qquad (2)$$

$$V_{R2} = K_2 \times V_v \quad (3)$$

Here, $K_1$, $K_P$ and $K_2$ are constants having a relationship of $K_1 < K_P < K_2$ therebetween and therefore provide a relationship of $V_{R1} < V_{RP} < V_{R2}$.

In the above equations (1), (2) and (3), the first reference speed $V_{R1}$ indicates a reference value for causing the slip control for drive wheels to start such as by means of reducing the output of an engine when the drive wheel speed exceeds said reference value; the target reference speed $V_{RP}$ indicates a drive wheel speed at which an appropriate slip rate of the drive wheels is obtained; and the second reference speed $V_{R2}$ indicates a reference value which is controlled so as to cause the engine to output a minimum power, for example, on the assumption that the drive wheel slip rate becomes excessively large when the drive wheel speed reaches this reference value. In performing these operations, it is also possible to detect the road condition simultaneously and, when the road surface is judged to be bad which makes a drive wheel slippage difficult to occur, to set the afore-mentioned constants $K_1$, $K_P$ and $K_2$ at respective larger levels as compared with the case of travelling on a normal road surface.

The degree $\theta$ of opening of an accelerator which is detected by an accelerator opening degree detector 6 is inputted to an accelerator opening degree change rate detector 7 at which an amount of correction $V_{RPap}$ for the target reference speed $V_{RP}$ which is based on the change rate of the accelerator opening degree is calculated out using the following equations (4) and (5) on the basis of a hysteresis $\theta$ of differentiated values of the accelerator opening degree $\theta$ and also of a hysteresis of that accelerator opening degree $\theta$, these equations serving as digital differentiation filters:

$$\dot{\theta}(k) = \phi_1 \times \dot{\theta}(k-1) + \phi_2 \times \dot{\theta}(k-2) + \phi_3 \times \dot{\theta}(k-3) + \psi_0 \times \theta(k) + \psi_1 \times \theta(k-1) + \psi_2 \times \theta(k-2) + \psi_3 \times \theta(k-3) \quad (4)$$

$$V_{RPap} = K_3 \times \dot{\theta}(k) \quad (5)$$

Here, $\phi_1$, $\phi_2$, $\phi_3$, $\psi_1$, $\psi_2$, $\psi_3$ and $K_3$ are constants, with the subscripts k, k−1, k−2 and k−3 representing the present value, the previous value, the next previous value and the second next previous value, respectively.

The target reference speed $V_{RP}$ which has been set at the reference value setting means 5 is inputted to a reference value correcting means 8 and this correcting means 8 operates to correct the target reference value $V_{RP}$ by the correction value $V_{RPap}$, as calculated at the accelerator opening degree change rate detector 7, according to the following equation (6):

$$V_{RP} = V_{RP} + V_{RPap} \quad (6)$$

The first reference speed $V_{R1}$ set at the reference value setting means 5 and the drive wheel speed Vw obtained by the drive wheel speed calculating means 3 are inputted to a control starting and termination judging means 9. When the drive wheel speed Vw exceeds the first reference speed $V_{R1}$, the judging means 9 generates an order for starting the slip control of drive wheels to a drive wheel torque reduction means 10. The drive wheel torque reduction means 10 is inputted with a corrected target reference speed $V_{RP}$, from the reference value correcting means 8, a second reference speed $V_{R2}$ from the reference value setting means 5 and a drive wheel speed Vw from the drive wheel speed calculating means 3 in addition to an output signal from the control starting and termination judging means 9. Thereby, the drive wheel torque is controlled so as to cause the drive wheel speed Vw to converge toward the corrected target reference speed $V_{RP}$. The drive wheel torque reduction means 10 may include means to control the output torque of an engine or means to control the braking force for the vehicle. The former control means may limit the amount of fuel supply to the engine or the amount of intake air thereto or delay the ignition timing of the engine by certain angle. The latter control means may reduce a hydraulic pressure fed to a brake.

The operation of this embodiment as constructed above will be explained below.

On the basis of a vehicle speed Vv produced from the vehicle speed calculating means 4, the reference value setting means 5 determines a first reference speed $V_{R1}$ for causing starting of the slip control operation for drive wheels when the drive wheel speed Vw exceeds the reference speed $V_{R1}$, a target reference speed $V_{RP}$ indicative of the drive wheel speed Vw of such a level as providing an appropriate slip rate, and a second reference speed $V_{R2}$ controlled in level so as to minimize the drive wheel torque on the assumption that the slip rate of the drive wheels becomes excessively large when the drive wheel speed Vw reaches the second reference value $V_{R2}$. At the reference value correcting means 8, the target reference speed $V_{RP}$ is corrected by an amount of correction $V_{RPap}$ which has been calculated by the accelerator opening degree change rate setting means 7 based on the change rate of an opening degree $\theta$ of accelerator.

If the drive wheel speed Vw rises above the first reference speed $V_{R1}$ which has been set by the reference value setting means 5, the control starting and termination judging means 9 generates an order to cause the drive wheel torque reduction means 10 to start the slip control operation for the drive wheels and during this operation, the drive wheel torque is controlled such as by means of increasing and decreasing the output torque of the engine or increasing and decreasing the braking force so as to permit the drive wheel speed Vw to converge toward the corrected target reference speed $V_{RP}$ between the first and second reference speeds $V_{R1}$ and $V_{R2}$. Due to this, the drive wheels are prevented from exhibiting an excessive slip, thereby keeping their slip rate at a proper level.

Thus, according to this embodiment, control is effected so as to correct the reference value for the slippage of drive wheels in such a manner that it increases when the opening degree of an accelerator abruptly increases and it decreases in response to an abrupt decrease in that opening degree. This enables the vehicle to respond to the operation of the accelerator thereby allowing a sporty travelling of the vehicle. Moreover, since the reference value increases and decreases in response to the change rate of the accelerator opening degree, the change in the reference value is of a momentary nature and the drive wheel slip control function is not deteriorated thereby.

While one embodiment according to the invention has been described above, the invention should not be limited thereto but various minor modifications can be made thereto without departure from the scope of the invention which is defined by appended claims.

For example, first reference speed $V_{R1}$, target reference speed $V_{RP}$ and second reference speed $V_{R2}$ set at the reference value setting means 5 can be corrected dependent on the steering condition, such as understeering and oversteering conditions. Although the target reference speed is used as a reference value for the slippage of a drive wheel in the above embodiment, it may not be limited thereto but may be modified such that the slip rate of the drive wheel and a reference value are instead used and/or the acceleration of the drive wheel and a reference acceleration are used. Moreover, although in this embodiment the reference value is corrected only on the basis of the change rate of the accelerator opening degree, it may instead be arranged that the reference value can be returned to an original value in accordance with a certain time function after it has reached a maximum level through a series of correcting operation or that a corrected value can be obtained on the basis of an accelerator opening degree and a predetermined map in addition to the change rate of the opening degree.

What is claimed is:

1. A drive wheel slip control system for a vehicle, comprising a reference value setting means for setting a reference value for slippage of a drive wheel providing an appropriate slipping condition, a drive wheel torque reduction means for reducing torque of said drive wheel when slippage of said drive wheel exceeds said reference value, an accelerator opening degree change rate detector for detecting a change rate of opening degree of an accelerator of a prime mover which drives said drive wheel and a reference value correcting means for correcting said reference value dependent on a signal outputted from said accelerator opening degree change rate detector.

2. The system recited in claim 1, wherein said reference value setting means sets three reference values which consist of a lower reference value for permitting starting of control of the torque of said drive wheel, an upper reference value, and a target reference value between said lower and upper reference values, wherein said reference value correcting means corrects said target value.

3. The system of claim 2, wherein said reference value correcting means corrects said target reference value by adding thereto an amount of correction, wherein said amount of correction being obtained based on a hysteresis of differentiated values of the opening degree of said accelerator and a hysteresis of the opening degree of the accelerator.

* * * * *